Patented Jan. 4, 1927.

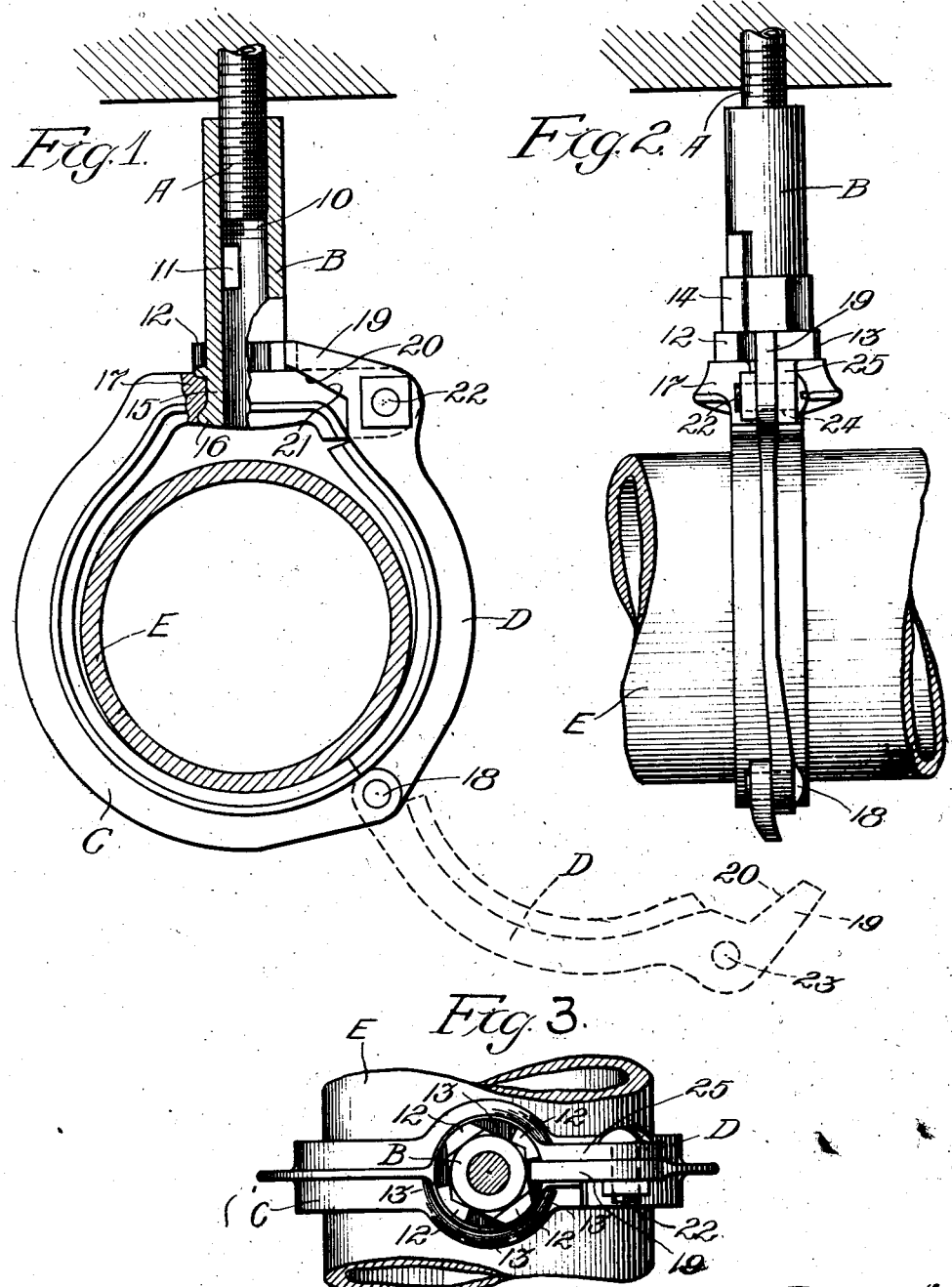

1,612,959

UNITED STATES PATENT OFFICE.

LOTHAR R. ZIFFERER, OF COLUMBIA, PENNSYLVANIA.

ADJUSTABLE PIPE HANGER.

Application filed May 3, 1923. Serial No. 636,343.

This invention relates generally to a means of support, such, for instance, as is particularly adapted for the suspension of overhead pipe lines of the kind commonly used in sprinkler systems for fire extinguishing purposes; and more particularly it is concerned with certain improvements in a device of the hanger type that is adjustable towards and from the wall, ceiling, or other fixed support, to which it is attached.

The objects of this invention, briefly summarized, are to provide a hanger for the purpose mentioned (1) that may be produced and installed at small expense; (2) that will remain in a fixed position of adjustment; and (3) that will facilitate mounting of the pipe thereupon. Other objects, however, are also contemplated as will more fully hereinafter appear from the specification and claims.

One embodiment of this invention in a desirable form is illustrated in the accompanying drawing wherein—

Figure 1 is a front elevation of the hanger showing in longitudinal section its relation to the supporting bolt and to a pipe which it is designed to carry; Fig. 2 is a side elevation; and Fig. 3 is a plan view thereof.

It may be mentioned at the outset that the device of this invention is adapted for threaded connection with a bolt A which may be secured to a wall, ceiling, or other fixed structure by any appropriate means. The hanger itself consists of but three parts, one being a sleeve B having a rotatable connection with a carrier C in the general form of a hook with which is associated a pivoted latch arm D.

The sleeve portion of the device, which is illustrated in longitudinal section in Fig. 1, is provided as at 10 with internal threads adapted to be engaged by the screw threads of the suporting bolt. Openings 11 may be arranged upon diametrically opposite sides of the sleeve, these being preferably elongated in the direction of the sleeve axis, so as to afford a view interiorly of the sleeve whereby its adjustment upon the bolt may be readily ascertained. Near the end of the sleeve where connection is made with the carrier C, is formed an annular shoulder 12 notched at intervals, as at 13, and adjacent thereto the sides of the sleeve may take on a polygonal formation as at 14 so as to provide a wrench hold.

The end of the sleeve where connection is made with the carrier is formed to provide a circular neck 15 which terminates in an enlarged head 16. Embracing this neck so as to swivel thereupon is a collar 17 which is joined to the upper end of the carrier hook C to thereby connect the carrier to the sleeve. Within the carrier may be seated a pipe E adapted to be placed therein by a lateral movement. A latch arm D is also provided to secure the pipe against displacement and this may be pivoted as at 18 to the hook end so as to have capacity for swinging movement, as indicated by the dotted lines in Fig. 1. The free end of this arm terminates in the form of a finger 19 having an inclined wedge face 20 adapted to rest upon an obliquely inclined wedge shoulder 21 formed upon one side of the collar. The finger extremity is receivable within one of the notches 13, in which position it may be held by a bolt 22 which extends through a hole 23 traversing the free end of the arm and through a second hole 24 in register therewith formed in a lug 25 that is extended laterally from the collar 17 adjacent the shoulder 21.

In installing the present hangers connections are first made with the supporting bolts, each sleeve being turned to adjust the device to the approximate height desired. Thereafter the pipe line is seated within the carrier supports and final adjustments made, following which each latch arm is swung to closed position with its finger extremity engaging within the proximate notch 13. Should any of the carrier supports have become bent during handling or installation, the same may easily be restored to correct position by swinging the latch arm to locking position and then delivering a blow to its free end as with the aid of a hammer, to cause the inclined face 20 to work along the oblique shoulder until the finger extremity is fully received within the proximate notch 13. Not only will such an operation result in realigning the carrier support to its intended position, but a registration of the two holes 23 and 24 will be assured, thereby facilitating application of the bolt 22 which serves to maintain the parts in this relation for an indefinite period of time. The several bolts 20, when applied in place, act both to lock each latch arm against the pipe, and to lock each carrier in adjusted position upon its associated sleeve. When so installed the vertical adjustments cannot be disturbed through accident or usage.

The present device is particularly advantageous in that it is compact, is always maintained in unitary relation, and is positive in its lock against change of adjustment when the bolt is tightened in place. It is further inexpensive to manufacture, and affords a very strong support for the load that is carried. Changes or modifications from the exact form shown are, of course, clearly possible, but where the construction embodies the principles of the invention, as defined in the claims below, it is to be deemed as within the scope of this patent.

I claim:

1. A pipe hanger in which is combined a sleeve and collar in swiveled relation, a carrier in the form of an open hook depending from the collar and integral therewith, a latch arm pivoted to the lower carrier end and movable to close the hook opening, an apertured lug extended laterally of the collar, an apertured finger at the free end of the latch arm adapted to rest adjacent the lug, there being in the sleeve a notch wherein a portion of the finger may releasably engage, and means extended through the aperture of the lug and finger whereby to secure the latch arm to the collar and prevent rotation of the sleeve relative thereto, substantially as described.

2. A pipe hanger in which is combined an inseparable swiveled collar and sleeve, the latter being screw-threaded for adjustment upon the threads of a support, a carrier of two interpivoted parts depending from the collar, a fixed connection between one carrier part and one side of the collar, means releasably connecting the other carrier part with the opposite collar side, and means on the sleeve with which the last named carrier part may releasably engage to lock the collar from rotating relative to the sleeve, substantially as described.

3. A hanger in which is comprised a hook of two pivoted arms suitably shaped to embrace a pipe, a collar to which one arm is integrally joined, means on the collar to which the other arm may be releasably connected, the free end of said last named arm being formed with a finger which extends past the collar, and a sleeve swivelly connected to the collar having adjacent thereto a notch for receiving the finger when its associated arm is in connection with the collar, the sleeve being thereby locked against rotation relative to the collar, but free to rotate when said arm is disconnected from the collar, substantially as described.

LOTHAR R. ZIFFERER.